United States Patent

Martin

[11] Patent Number: 5,555,963
[45] Date of Patent: Sep. 17, 1996

[54] ELECTROMAGNETICALLY CONTROLLED HYDRAULIC CLUTCH

[75] Inventor: Hans Martin, Stuttgart, Germany

[73] Assignee: Behr GmbH & Co., Stuttgart, Germany

[21] Appl. No.: 358,581

[22] Filed: Dec. 14, 1994

[30]  Foreign Application Priority Data

Dec. 23, 1993 [DE] Germany ............... 43 44 085.1

[51] Int. Cl.⁶ .................. F16D 35/02; F16D 48/06
[52] U.S. Cl. ....................... 192/58.61; 192/58.8
[58] Field of Search ............... 192/58.61, 58.8, 192/84 R

[56]  References Cited

U.S. PATENT DOCUMENTS

| | | | |
|---|---|---|---|
| 4,227,861 | 10/1980 | LaFlamme | 416/169 |
| 4,265,348 | 5/1981 | Clarke | 192/58.61 |
| 4,270,641 | 6/1981 | Nonnemann et al. | 192/82 T |
| 4,302,156 | 11/1981 | LaFlamme | 416/169 |
| 4,310,085 | 1/1982 | LaFlamme | 192/58 B |
| 4,633,994 | 1/1987 | Light | 192/58.61 |

FOREIGN PATENT DOCUMENTS

| | | |
|---|---|---|
| 2804859 | 8/1979 | Germany . |
| 3109724 | 2/1982 | Germany . |
| 4205523 | 8/1993 | Germany . |
| 2071822 | 9/1981 | United Kingdom . |

Primary Examiner—Rodney H. Bonck
Attorney, Agent, or Firm—Foley & Lardner

[57]  ABSTRACT

An electronically controlled hydraulic clutch includes a driveshaft and drive disc which is mounted thereon and rotates in a working chamber of a housing which is rotatably mounted on the driveshaft. The housing has in addition a reservoir chamber which is divided off from the working chamber by a dividing wall and which is connected in terms of flow to the working chamber via a valve opening and a return channel. The valve opening is controlled via a valve lever which is actuated by an electromagnet which is mounted in a fixed manner so as to be capable of rotating on the housing, and the electromagnet is arranged within the reservoir chamber.

19 Claims, 4 Drawing Sheets

ELECTROMAGNETICALLY CONTROLLED HYDRAULIC CLUTCH

BACKGROUND OF THE INVENTION

The invention relates to a hydraulic clutch, particularly to such a clutch having a valve opening controlled by a valve lever actuated by an electromagnet.

A hydraulic clutch has been disclosed in DE-B-28 04 859 by the applicant. In this design, an electromagnet is mounted in the end wall of the clutch in a fixed manner so as to be rotatable by means of a ballbearing and the valve lever which is located in the reservoir chamber bears in its central area, i.e. the area near to the axle, a permanent magnet which is located in the area of effect of the electromagnet with an intermediate gap. The valve lever can thus be actuated by acting on the electromagnet, the permanent magnet not being attracted but rather repelled so that the gap is maintained. Between the electromagnet and the permanent magnet there is a sealing plate which increases the distance and impedes the magnetic flux. Therefore, the electromagnet must be given larger dimensions which entails disadvantages in terms of weight and costs. In addition, with this design it is disadvantageous that this type of magnet control cannot be used for a plurality of valve levers within the reservoir chamber as has been disclosed in DE-A-42 05 523 by the applicant. Moreover, because of its minimum radial dimensions a relatively large ballbearing with corresponding weight is necessary for this magnet which is located inside the ballbearing.

SUMMARY OF THE INVENTION

The object of the invention is to avoid the above-mentioned disadvantages and to provide a simple, lightweight electromagnetic control for the hydraulic clutch mentioned at the beginning.

This object is achieved by a hydraulic clutch comprising a driveshaft and drive disc which is mounted thereon and rotates in a working chamber of a housing which is rotatably mounted on the driveshaft. The housing has a reservoir chamber which is divided off from the working chamber by a dividing wall and which is connected in terms of flow to the working chamber via a valve opening and a return channel. The valve opening is controlled via a valve lever which is actuated by an electromagnet which is mounted in a fixed manner so as to be capable of rotating on the housing, and the electromagnet is arranged within the reservoir chamber.

By virtue of the arrangement of the electromagnet in the form of an annular magnet within the reservoir chamber it is possible to actuate the valve lever or levers with a minimum gap in an electromagnetically efficient manner, specifically also without using a permanent magnet if the valve lever is attracted against a stop in the housing. Thus, a gap always remains between the rotating valve lever and the fixed magnet so that a friction-free relative movement is possible. Furthermore, the electromagnet is located inside the clutch and is therefore not subjected to any external mechanical or chemical influences.

Further advantageous embodiments result from, and additional objects and advantages of the invention will be set forth in, the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred exemplary embodiments of the invention, and, together with the general description given above and the detailed description of the preferred embodiments given below, serve to explain the principles of the invention.

In the drawings.

DETAILED DESCRIPTION OF THE PREFERRED EMBODIMENTS

Figure 1:
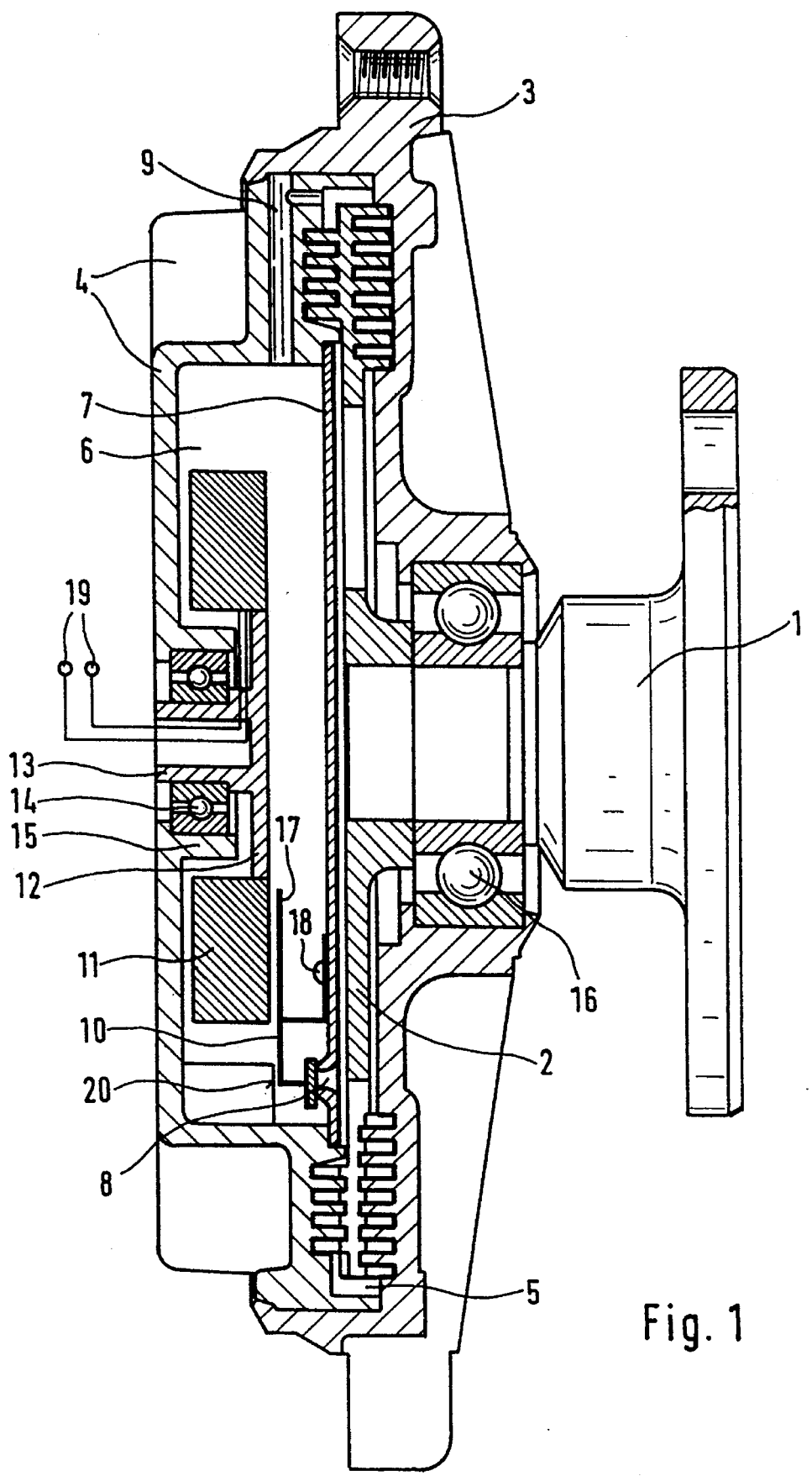
FIG. 1 shows the entire hydraulic clutch in section.

FIG. 1 shows a hydraulic clutch with a driveshaft 1 which bears on the end a drive disc 2 which is mounted fixed in terms of rotation on the driveshaft 1 and in addition a ballbearing 16 by means of which a housing 3 is mounted so as to be rotatable with respect to the driveshaft 1. The drive disc 2 rotates in a working chamber 5 which is divided off from a reservoir chamber by means of a dividing wall 7 but is connected in terms of flow to the reservoir chamber 6 via a valve opening 8 and a return channel 9.

In the working chamber 5 and in the reservoir chamber there is a viscous medium (silicon fluid) which circulates between the two chambers, the inflow through the valve opening 8 being controlled by a valve lever 10 while the return flow takes place continuously via the return channel 9. Within the reservoir chamber 6 an annular magnet 11 is arranged which is mounted on a carrying disc 12 which itself has a cylindrical hollow hub 13. The annular magnet 11 is mounted in a fixed manner with respect to a bearing seat 15 in the end wall of the housing 3 by means of a ballbearing 14 which is arranged on the hollow hub 13. Electrical terminals 19 are led through the hollow hub 13 to the annular magnet 11. In the area of effect of the electromagnet 11 there is an armature element 17 of the valve lever 10 which is attracted by the annular magnet 11 and as a result closes the valve opening 8 (cf. FIG. 1), an optimum gap always being maintained between the circumferential armature element 17 and the valve lever 10 and the fixed annular magnet 11. When the annular magnet 11 is de-energized, the armature element 17 drops out, the valve opens and the valve lever 10 rests against the stop 20. The entire valve lever 10 is permanently connected to the dividing wall 7 by means of attachment element 18. This illustration of the valve lever 10 in FIG. 1 does not correspond completely to FIG. 2.

Figure 2:
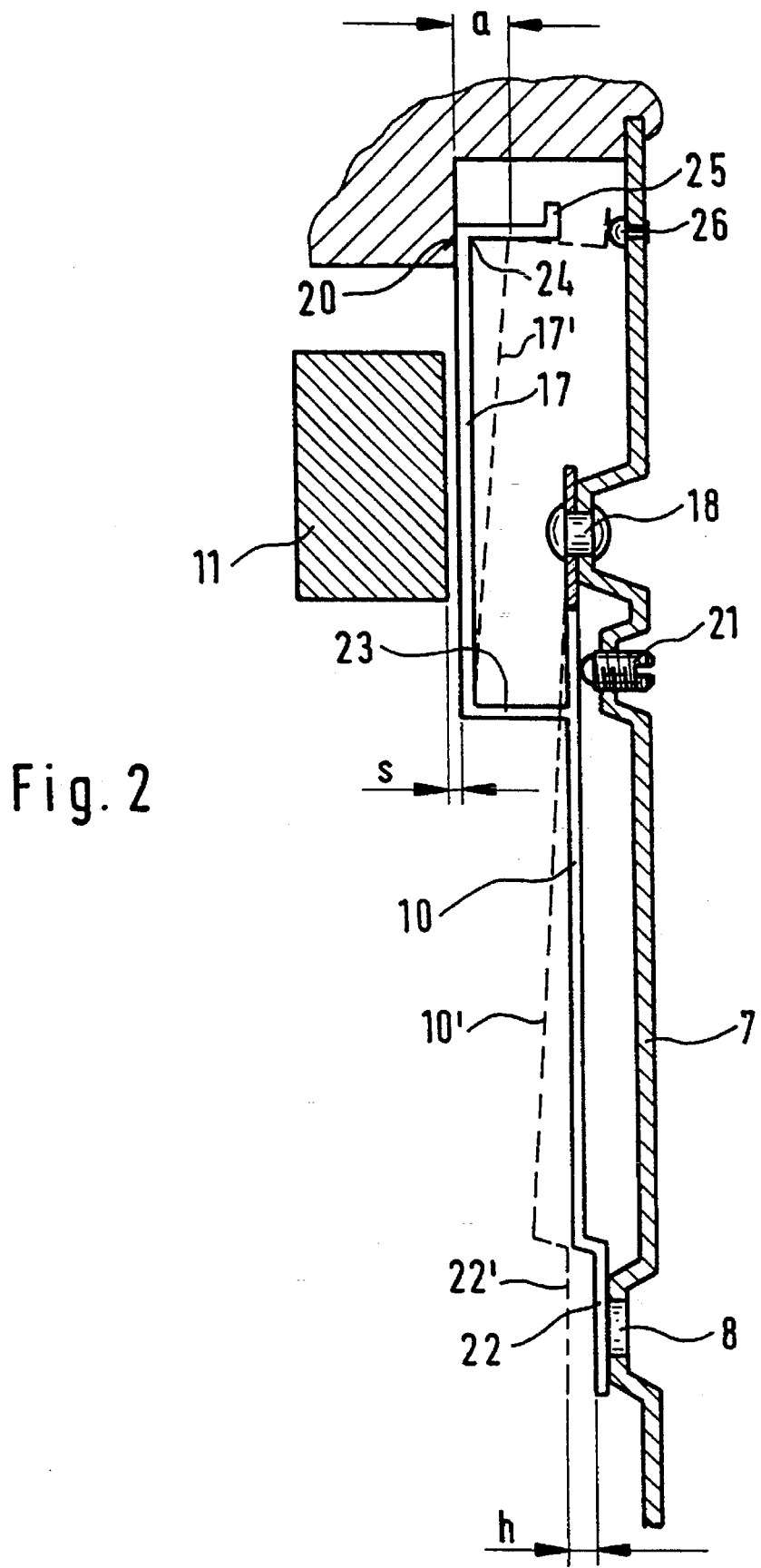
Fig 2 shows a partial section with a valve lever and annular magnet.

FIG. 2 shows a more precise and slightly changed illustration of the valve lever 10 in conjunction with the dividing wall 7 and the annular magnet 11, identical reference symbols being used for identical parts as in FIG. 1. The valve lever 10 is permanently connected to the dividing wall 7 at the end by means of a rivet 18 and is adjusted with respect to its pretensioning by an adjustment screw 21 which can be adjusted in the dividing wall 7, specifically in such a way that turning the adjustment screw 21 in (increasing the distance between valve lever 10 and dividing wall 7) brings about greater pretensioning and thus requires a stronger magnetic force. The end 22 (closing element), which, is opposite the rivet 18, of the valve lever 10 is slightly bent and closes the valve opening 8 in the dividing wall 7. In the approximately central area of the valve lever 10 a web 23 is mounted which protrudes approximately perpendicularly from the valve lever 10, the we4b 23 being adjoined approximately at a right angle by an armature element 17 which ends with a stop area 24 and then is bent once more as far as a further stop 25. The armature element 17 is located in the direct area of effect of the annular magnet 11 and is attracted thereby as soon as the annular magnet is energized, but only as far as the stop 20 of the clutch housing so that a gap s is always maintained between the valve lever 10 which rotates with the housing and the fixed annular magnet 11.

When the armature element 17 is attracted, i.e. towards the left, a reversal of movement, i.e. towards the right, takes place for the valve lever 10 and the closing element 22 since the valve lever is constructed as a rocker. The valve lever 10, 17 is shown in the drawing in unbroken bold lines in the closed position (valve opening 8 closed by valve closing element 22). The open position of the valve lever is shown by broken lines 10', 17' while that is to say when the closing element 22' has lifted off from the valve opening 8 by the opening travel h. Then, due to the spring effect of the valve lever 10, 10', the armature element 17 has also dropped off into the open position 17', specifically with the second stop 25 against the stop 26 on the dividing wall 7. Thus, the maximum distance between magnet 11 and armature element 17, the so-called armature stroke a, is defined and safeguarded by virtue of the fact that the operational capacity is maintained with the same magnet. The valve opening travel h constitutes a minimum travel of the closing element 22 which, however, becomes greater as pretensioning becomes greater. The valve 8, 22 is therefore opened in the de-energized state of the annular magnet 11, i.e. the clutch is actuated when the current fails.

Figure 3:
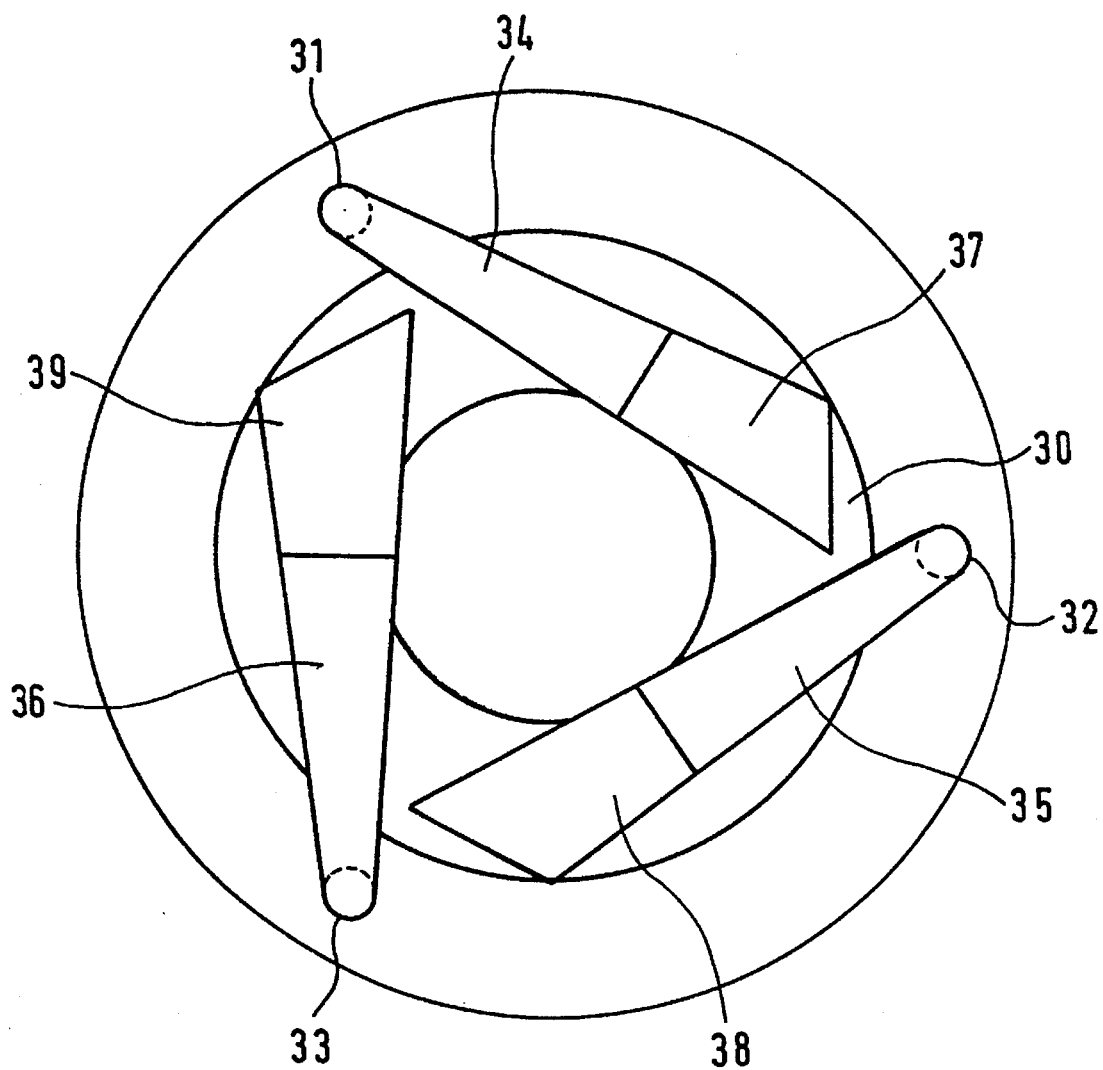
FIG. 3 shows a partial view of the valve levers.

FIG. 3 shows a further variant, namely the arrangement of a plurality of valve levers in the reservoir chamber, as has been disclosed in DE-A-42 05 523 by the applicant, however with an electromagnet arranged outside the clutch. In this exemplary embodiment, three valve openings 31, 32, 33 are therefore provided in the dividing wall, distributed over the circumference, the valve openings 31, 32, 33 being monitored by three valve levers 34, 35, 36 whose end regions or armature elements 37, 38, 39 lie in the area of effect of the coil or of the annular magnet 30 and thus can be successively or simultaneously attracted by this coil 30. For this, valve levers which differ in their spring stiffness or pretensioning, and a step magnet in accordance with aforesaid prepublication by the applicant, are required. The pretensioning can be adjusted by the above described adjustment screw 21 to be different for the individual valve levers.

Figure 4:
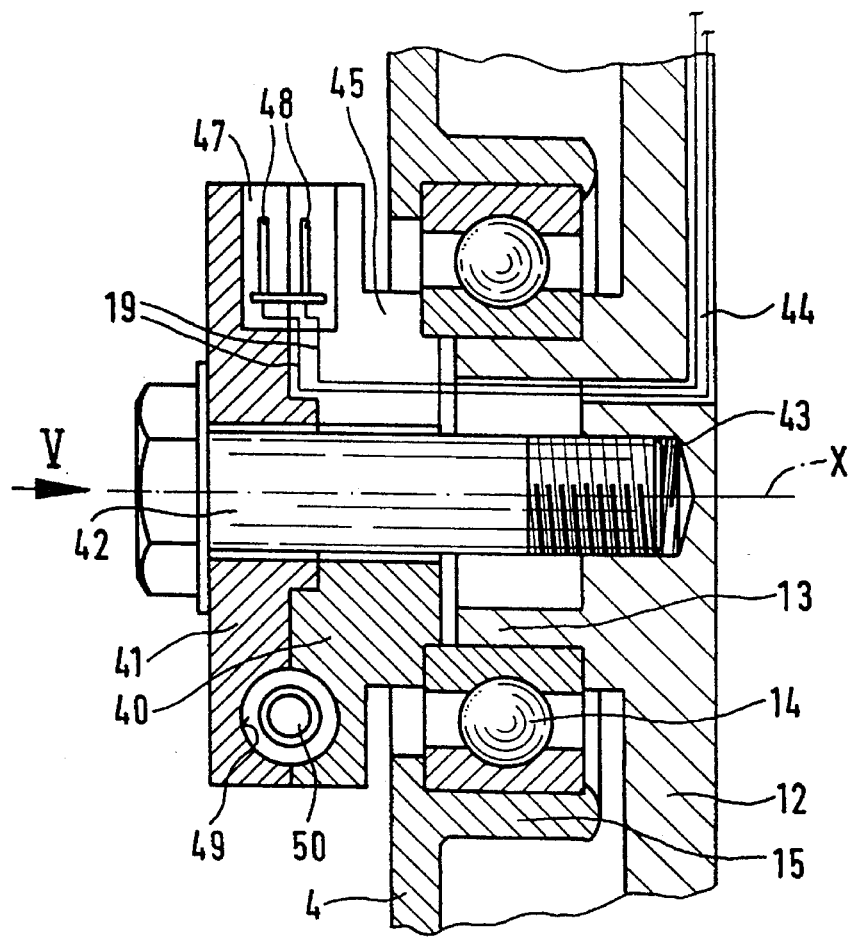
FIG. 4 shows a partial view with torque support.

FIG. 4 shows a partial section with a further embodiment of the invention which relates to the external supporting of the annular magnet 11. For this purpose, the area around the bearing 14, the hollow hub 13 and the carrying disc 12 for the annular magnet 11 are shown enlarged (as illustrated in FIG. 1) and supplemented with the following parts: a first flange plate 40 is arranged concentrically with respect to the hollow hub 13 and has a slotted area 45 for the electrical terminals 19 with plug 48 to pass through, the terminals 19 with plug 48 leading through a channel 44 in the carrying disc 12 to the annular magnet 11. The first flange plate 40 is clamped by a second, external flange plate 41 against the hollow hub 13 or the carrying disc 12 by means of a screw 42 by the screw 42 being screwed at the end into a thread 43 which is provided in the carrying disc 12. Thus, a frictional connection is established between the carrying plate 12 and the two flange plates 40 and 41 which are also clamped to one another. A transverse hole 49 which receives, with radial play, a rod or a pipe 50 which forms the torque support is provided tangentially outside the axis X of rotation in the joint area of the two flange plates 40, 41. In addition, a depression 47 is radially let into the two flange plates 40, 41, which depression 47 receives the plug 48 for the two electric terminals 19 for the annular magnet 11. At the same time, the plug 48 which is permanently connected to the connection cable 19 and plugged through the slot 45 from the inside to the outside is clamped in between the two flange plates so that it is securely mounted.

Figure 5:
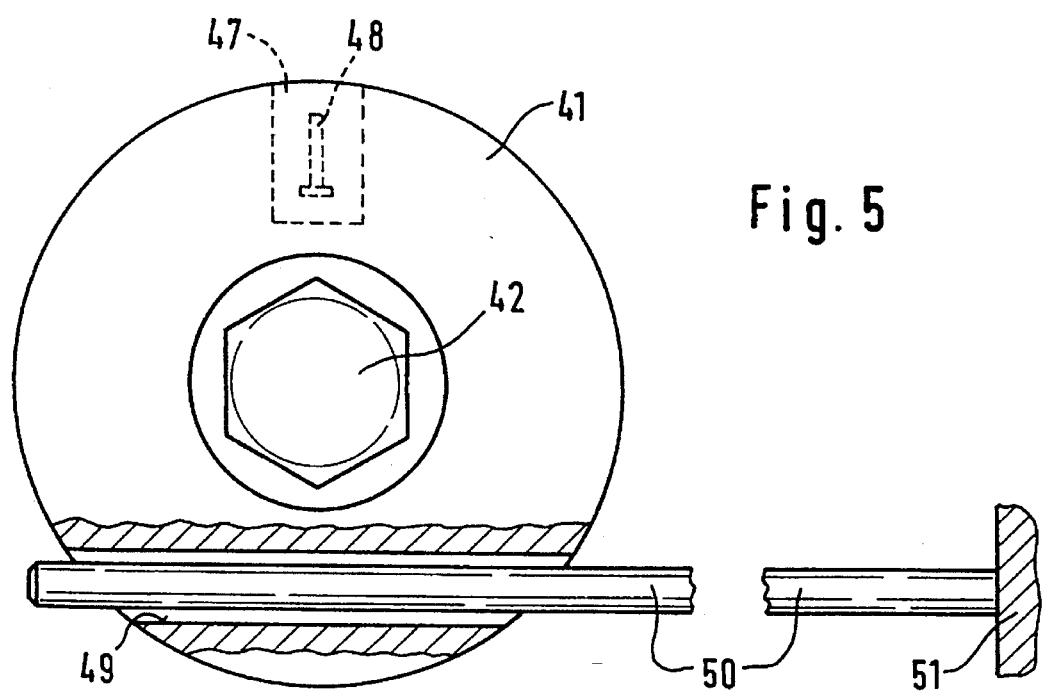
FIG. 5 shows a partial view in the direction V of the torque support according to FIG. 4.

FIG. 5 is a partial view in the direction V of the clutch showing how the torque support 50 in the form of a rod or pipe is on the one hand received in the eccentrically arranged transverse hole 49 and on the other hand mounted on the vehicle side on a support 51. Since the torque support 50 is received with radial play in the transverse hole 49, relative movements between the clutch and the body of the vehicle can be compensated.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A hydraulic clutch comprising:

a driveshaft;

a housing rotatably mounted on the driveshaft, the housing having a working chamber, wherein the housing has a reservoir chamber divided from the working chamber by a dividing wall, the reservoir chamber and the working chamber communicating through a valve opening and a return channel;

a drive disc mounted on the driveshaft and rotatable in the working chamber;

an annular ring electromagnet positioned within the reservoir chamber, wherein the ring electromagnet is mounted to the housing so that the housing can rotate relative to the ring electromagnet; and a valve lever mounted to the dividing wall, wherein the valve opening and closing are controlled by moving the valve lever with the ring electromagnet.

2. The hydraulic clutch as claimed in claim 1, further comprising a carrying disc having a hub, the hub being mounted to the housing, wherein the ring electromagnet is mounted to the carrying disk.

3. The hydraulic clutch as claimed in claim 2, further comprising a ballbearing and a bearing seat in the housing, the ballbearing being seated between the hub and the bearing seat, wherein the annular ring electromagnet is concentrically positioned around the bearing seat.

4. The hydraulic clutch as claimed in claim 1, wherein the valve lever is attached to the dividing wall and is pretensioned toward a valve opening direction, wherein the valve lever is moved toward a valve closing direction by the electromagnet countering the pretension.

5. The hydraulic clutch as claimed in claim 4, further comprising an adjustment screw for adjusting the pretensioning.

6. The hydraulic clutch as claimed in claim 1, wherein the valve lever has a first stop and an armature element in a magnetic flux area of the ring electromagnet, the first stop being attracted toward a fixed stop in the housing to maintain a gap between the ring electromagnet and the lever.

7. The hydraulic clutch as claimed in claim 6, wherein the valve lever has a second stop, which in an open position of the valve rests against the dividing wall and defines an armature stroke of the armature element.

8. The hydraulic clutch as claimed in claim 1, wherein a plurality of valve openings are arranged in the dividing wall and a plurality of valve levers are arranged in an area of effect of the electromagnet in the reservoir chamber, which valve levers being switchable successively or simultaneously.

9. The hydraulic clutch as claimed in claim 1, further comprising a torque support operatively connected to the ring electromagnet to prevent the ring electromagnet from rotating with the housing.

10. The hydraulic clutch as claimed in claim 9, wherein the torque support is a rod or pipe, with on one end thereof received in a tangential transverse hole of a coupling-side flange and on the other end is supported in a fixed manner.

11. A hydraulic clutch comprising:

a driveshaft;

a housing rotatably mounted on the driveshaft, the housing having a working chamber, wherein the housing has a reservoir chamber divided from the working chamber by a dividing wall, the reservoir chamber and the working chamber communicating through a valve opening and a return channel;

a drive disc mounted on the driveshaft and rotatable in the working chamber;

an electromagnet positioned within the reservoir chamber, wherein the electromagnet is mounted to the housing so that the housing can rotate relative to the electromagnet; and a valve lever mounted to the dividing wall, wherein the valve opening and closing are controlled by moving the valve lever with the electromagnet, wherein the valve lever is pretensioned toward a valve opening direction, wherein the valve lever is moved toward a valve closing direction, counter to the pretension, with the electromagnet.

12. The hydraulic clutch as claimed in claim 11, further comprising a carrying disc having a hub, the hub being mounted to the housing, wherein the electromagnet is mounted to the carrying disk.

13. The hydraulic clutch as claimed in claim 12, further comprising a ballbearing and a bearing seat in the housing, the ballbearing being seated between the hub and the bearing seat, wherein the electromagnet is concentrically positioned around the bearing seat.

14. A hydraulic clutch comprising:

a driveshaft;

a housing rotatably mounted on the driveshaft, the housing having a working chamber, wherein the housing has a reservoir chamber divided from the working chamber by a dividing wall, the reservoir chamber and the working chamber communicating through a valve opening and a return channel;

a drive disc mounted on the driveshaft and rotatable in the working chamber;

an electromagnet positioned within the reservoir chamber, wherein the electromagnet is mounted to the housing so that the housing can rotate relative to the electromagnet; and a valve lever mounted to the dividing wall, wherein the valve opening and closing are controlled by moving the valve lever with the electromagnet, wherein the valve lever has a first stop and an armature element in a magnetic flux area of the electromagnet, the first stop being attracted toward a fixed stop in the housing to maintain a gap between the electromagnet and the lever.

15. The hydraulic clutch as claimed in claim 14, further comprising a carrying disc having a hub mounted to the housing, wherein the electromagnet is mounted to the carrying disk.

16. The hydraulic clutch as claimed in claim 15, further comprising a ballbearing and a bearing seat in the housing, the ballbearing being seated between the hub and the bearing seat, wherein the electromagnet is concentrically positioned around the bearing seat.

17. A hydraulic clutch comprising:

a driveshaft;

a housing rotatably mounted on the driveshaft, the housing having a working chamber, wherein the housing has a reservoir chamber divided from the working chamber by a dividing wall, the reservoir chamber and the working chamber communicating through a plurality of valve openings and a return channel;

a drive disc mounted on the driveshaft and rotatable in the working chamber;

an electromagnet positioned within the reservoir chamber, wherein the electromagnet is mounted to the housing so that the housing can rotate relative to the electromagnet; and a plurality of valve levers mounted to the dividing wall, wherein the valve opening and closing are controlled by moving the valve levers with the electromagnet, the valve levers being switchable successively or simultaneously.

18. The hydraulic clutch as claimed in claim 17, further comprising a carrying disc having a hub, the hub being mounted to the housing, wherein the electromagnet is mounted to the carrying disk.

19. The hydraulic clutch as claimed in claim 18, further comprising a ballbearing and a bearing seat in the housing, the ballbearing being seated between the hub and the bearing seat, wherein the electromagnet is concentrically positioned around the bearing seat.

\* \* \* \* \*